Aug. 4, 1970 A. BOTTANI 3,522,988

AUTOMATIC AUDIO AND AUDIO-VISUAL PROJECTION APPARATUS

Filed Oct. 19, 1967 4 Sheets-Sheet 1

INVENTOR
ANGELO BOTTANI
BY Hubbell Cohen Stiefel
ATTORNEYS.

Aug. 4, 1970 A. BOTTANI 3,522,988

AUTOMATIC AUDIO AND AUDIO-VISUAL PROJECTION APPARATUS

Filed Oct. 19, 1967 4 Sheets-Sheet 2

INVENTOR
ANGELO BOTTANI
BY Hubbell, Cohen & Stiefel
ATTORNEYS.

INVENTOR
ANGELO BOTTANI
BY
Hubbell Cohen & Stiefel
ATTORNEYS.

AUTOMATIC AUDIO AND AUDIO-VISUAL PROJECTION APPARATUS

Filed Oct. 19, 1967 4 Sheets-Sheet 4

INVENTOR
ANGELO BOTTANI
BY Hubbell, Cohen & Stiefel
ATTORNEYS.

3,522,988

AUTOMATIC AUDIO AND AUDIO-VISUAL PROJECTION APPARATUS

Angelo Bottani, Milan, Italy, assignor to Societa Internazionale Fonovisione S.p.A., Milan, Italy, a corporation of Italy Continuation-in-part of application Ser. No. 488,636, Sept. 20, 1965. This application Oct. 19, 1967, Ser. No. 676,439
Claims priority, application Italy, Sept. 22, 1964, 51,460/64; Oct. 26, 1966, 29,290/66
Int. Cl. G03b 31/00
U.S. Cl. 352—8 12 Claims

ABSTRACT OF THE DISCLOSURE

A coin operated combined sound reproducing apparatus and audio-visual apparatus. The sound apparatus has a plurality of sound recordings and mechanisms for selecting and playing back the recordings. The audio-visual apparatus has a plurality of sound films and mechanisms for selecting and projecting the films. A memory apparatus is provided for storing information in response to actuation of the selecting mechanisms and alternatively actuating the sound reproducing apparatus or the audio-visual apparatus in accord with the stored information.

This is a continuation-in-part of my earlier application Ser. No. 488,636 filed by me on Sept. 20, 1965 now abandoned.

BACKGROUND OF THE INVENTION

The present invention relates to a combined sound reproducing apparatus and audio-visual apparatus such as, for instance, a combined juke box and Cinebox.

DESCRIPTION OF THE PRIOR ART

Sound reproduction apparatuses, commonly known as juke boxes, are well known. In some forms of such sound reproduction apparatus there is included a memory system whereby a plurality of records may be selected in advance and the sound reproduction apparatus will play them sequentially, retaining the instructions until the operation is complete.

The audio-visual reproduction apparatus sold under the trademark Cinebox is also known. Such devices include a plurality of motion picture films which may be selected one at a time and played on a rear projection screen forming part of the device. Such audio-visual apparatus may also include a memory apparatus for storing instructions to play more than one film in sequence.

SUMMARY

The present invention is directed to a combined sound reproducing apparatus and audio-visual apparatus including memory means for both apparatuses, which memory means permits the sequential playing of films and records. Specifically, the memory means associated with the sound reproduction apparatus includes a plurality of circularly arranged axially movable pegs which are actuated by a rotatable electromagnet that moves along the circumference of the circle. Positions are provided in the circle where pegs are not included and in such positions a circuit is conditioned to close to energize one of a multiplicity of electromagnets in the audio-visual apparatus memory device. Each of the latter electromagnets is associated with an axially movable peg which serves as the storage means for the memory device of the audio-visual apparatus.

BRIEF DESCRIPTION OF THE DRAWINGS

FIG. 4*a* is a plan view of the electromagnets of the memory apparatus of the audio-visual apparatus;

FIG. 4*b* is a plan view of the memory disc of the sound reproduction apparatus;

FIG. 4*c* is a view similar to FIG. 3 but interrelating said figure to FIG. 4*b*;

DESCRIPTION OF THE PREFERRED EMBODIMENT

Figures 1, 4:
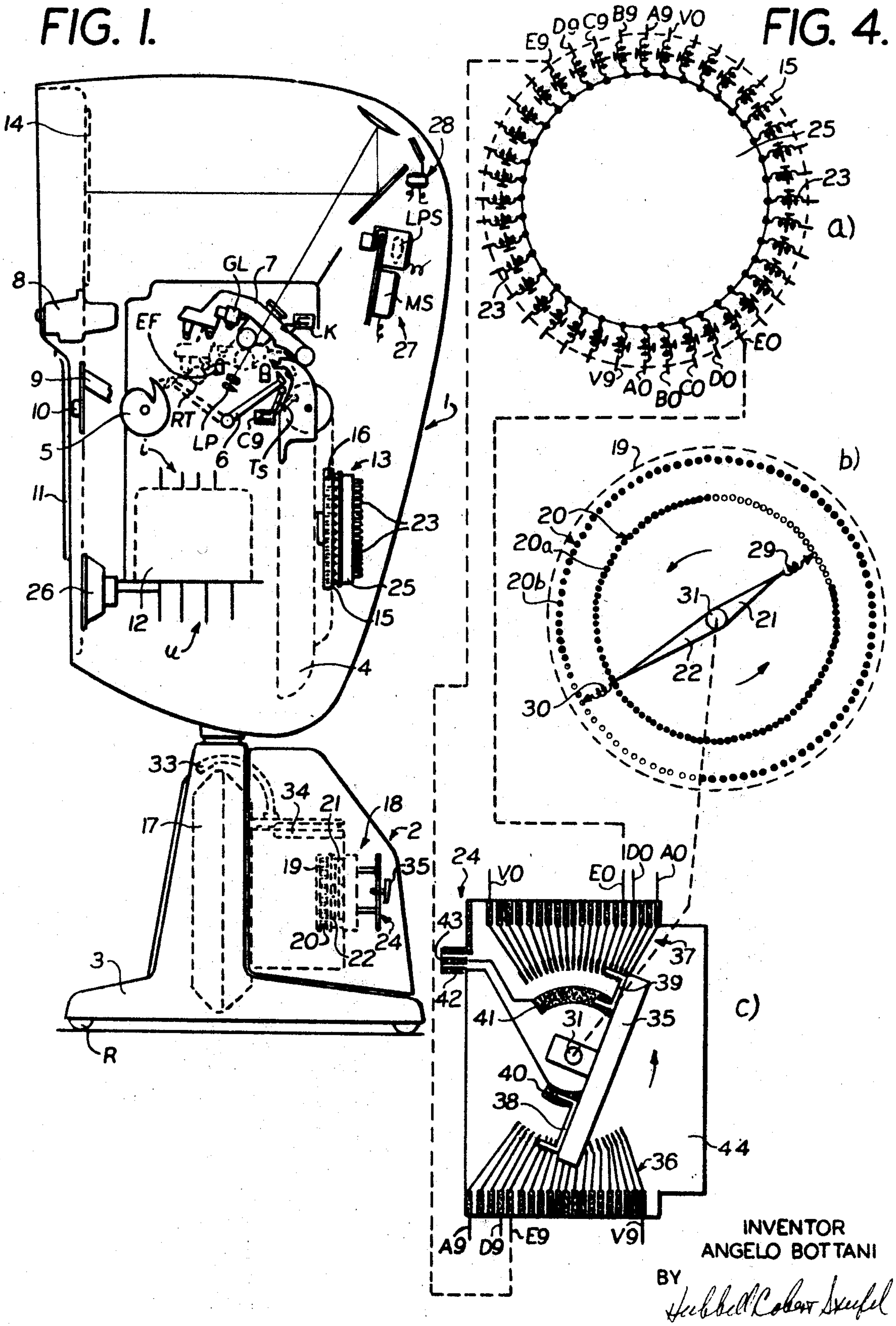
FIG. 1 is a vertical cross sectional view, partly schematic, of a combined audio-visual apparatus and sound reproduction apparatus and memory means associated therewith, in accordance with the present invention.

In the drawings the various parts of the combined apparatus are shown in non-operating or rest position; and the corresponding parts are indicated with the same symbols.

Referring now to the drawings in detail, and with particular reference to FIG. 1, the combined apparatus comprises an upper portion constituting an audio-visual apparatus 1 and a lower portion constituting the sound reproduction apparatus 2. The two component apparatuses which are of known type constitute a single unit supported by a base 3 optionally provided with small rollers R for moving the entire unit on the floor. Of course, if desired, the sound reproduction apparatus could be separated from the audio-visual apparatus, but in any event the two apparatuses will always be functionally connected. The audio-visual apparatus 1 is illustrated in U.S. Pat. No. 3,081,668 issued on Mar. 19, 1963, to which reference may be had for a more detailed description.

Each of the component apparatuses, solely by way of example, is of the type in which the operations of memorizing a selected program are obtained by means of a memory disc bearing a series of pegs which are actuated by electromagnets. The memory disc and the electromagnets form part of the search units of the apparatus.

As illustrated in FIG. 1, the audio-visual apparatus comprises a rotatable film magazine 4, a single film receiving spool 5, a ratchet arm 6 for bringing the selected film onto said receiving spool 5 and a presser arm 7, for holding the film in projection position. Presser arm 7 is adapted to assume two positions, a raised or rest position, illustrated in solid lines in FIG. 1, and a lowered or operating position, illustrated in dotted lines in FIG. 1. The acoustic playback and projection system for the film is mounted in part on this arm 7, and in part on the housing of the apparatus, similar to the means for the guiding and transporting of the film which in the drawing is indicated in dotted line in the projection position.

Audio-visual apparatus 1 further comprises program selection keys 8, coin introduction means 9, coin return means 10, a program listing 11, an amplifier 12 having input connections *i* and output connections *u*, a search unit 13 and a projection screen 14.

The search unit 13 comprises a fixed memory disc 15, mounted on the shaft (not shown) of the magazine 4, and provided with circumferentially arranged pegs 16 in a number equal to the number of audio-visual programs. The pegs 16 are actuatable by an electromagnet to move axially from a rest position within the disc 15 to an operating position wherein they protrude from the disc 15 toward the magazine 4.

Feeler arm T*s* is rotatably mounted for contacting the outer diameter of the film supply spool during the projection and rewinding. The operation of this feeler arm will be made clear hereinafter in the detailed description of the operation of the apparatus.

The other component apparatus, sound reproduction apparatus 2, is also of known type. As illustrated in FIG. 1, sound reproduction apparatus 2 comprises a rotatable record magazine 17 and a search unit 18 which comprises, among other things a fixed memory disc 19 provided with pegs 20 and the operator electromagnets borne by the rotating arms 21 and 22. In accordance with a first feature of the invention, the coupling of the two apparatuses 1 and 2 is obtained by associating with the memory disc 15 of the audio visual apparatus 1 as many operator electromagnets 23 as there are pegs 16 and energizing said electromagnets by means of a power distributor 24 associated with the search unit 18 of the sound reproduction apparatus. The electromagnets 23 are borne by a fixed disc 25 which is also coaxial with the magazine 4 so that opposite each electromagnet there is a peg 16. In FIG. 4*a* the arrangement of the electromagnets 23 is clearly seen, but the pegs 16 of the disc 15 are not included therein for purposes of clarity of illustration of the included parts (see FIG. 4*b*).

By way of example, let us assume that there are 40 electromagnets 23 to which there corresponds the same number of pegs 16 and of films stored in the apparatus 1.

Referring to FIG. 1, the keyboard 8 constitutes the sole means of selecting the audio-visual and sound programs of the apparatus. It is formed of thirty keys: twenty letters, for instance A, B, C, D, E. . . . V and ten numbers 1, 2, 3 . . . 9, 0.

The selection of a program is obtained by depressing two keys, namely a letter key and a number key; the numbers 9 and 0 are reserved, in combination with the 20 letters, for the selecting of the forty audio-visual programs.

Other parts common to the two apparatuses are the coin introduction means 9, the coin return means 10, the program listing panel 11, the amplifier 12 and the various loudspeakers such as 26. One pair of input connections *i* of the amplifier is connected to the pick-up of .he sound reproduction apparatus while another pair is connected to the sound playback device of the audio-visual apparatus 1. In the apparatus 1, the sound playback device of the film is assumed to be of the optical type and there is indicated by GL the sound pick-up group bearing the exciting lamp LE with the photosensitive element EF.

The output connections *u* of the amplifier 12, in addition to supplying the loudspeakers of the apparatus, supply other apparatuses which will be discussed below. Before considering FIGS. 2 to 7 which better illustrate the invention, it should be pointed out that the combined apparatus can be produced from any type of sound reproduction apparatus and audio-visual apparatus, provided that the memory operation is included in such apparatuses, since the present invention is based on the principle of using any of such operations of one of the apparatuses, for example the sound reproduction apparatus for the memorizing and the replaying of the programs of the other apparatus.

Figure 2:
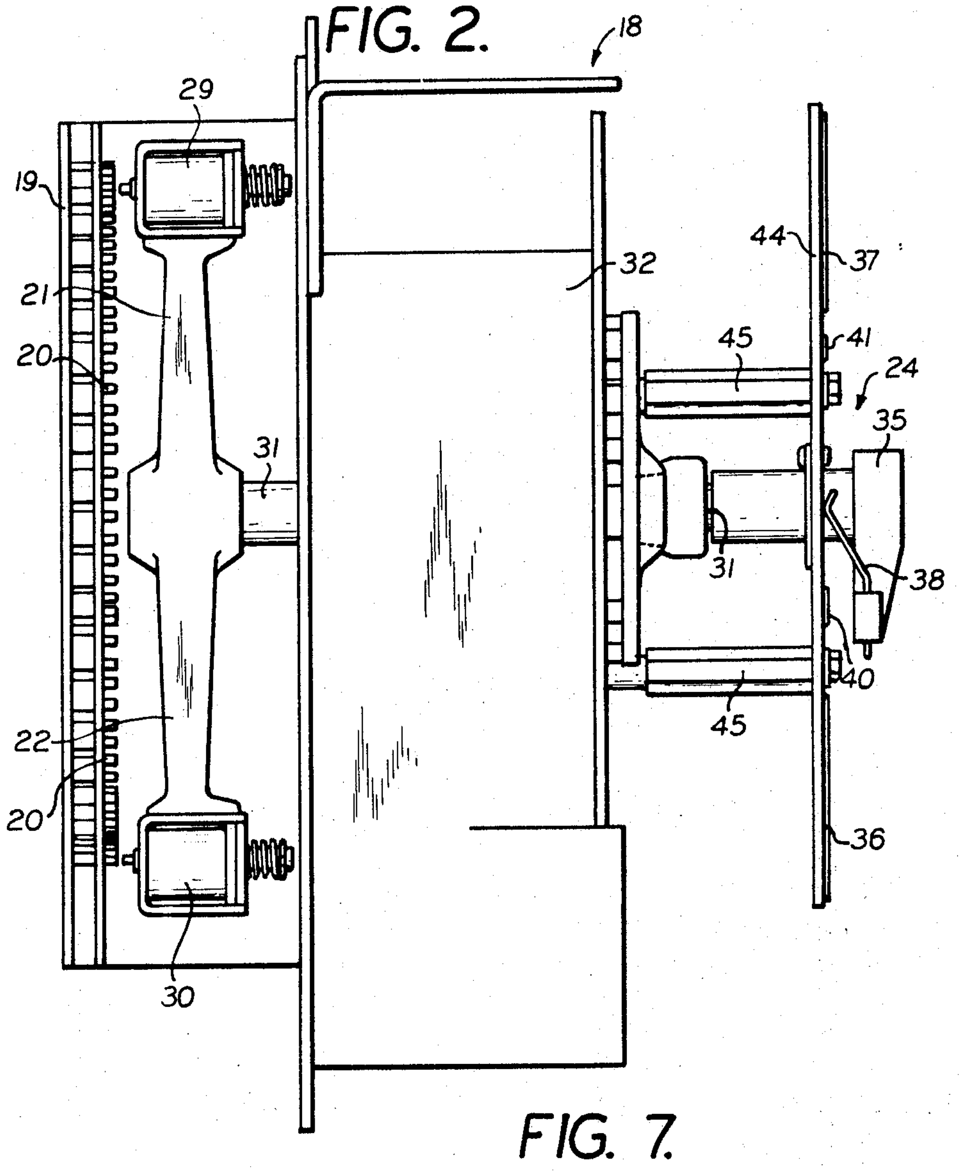
FIG. 2 is a side elevational view of the memory means of both the sound reproduction apparatus and the audio-visual apparatus.

As stated, FIG. 2 shows on an enlarged scale the search unit 18 of the sound reproduction apparatus 2, supplemented in accordance with the invention, with the addition of an electric feed distributor 24. In this figure as well as in the schematic showing of FIG. 4*b*, there can be noted more clearly the memory disc 19 with the pegs 20 and the two arms 21 and 22 bearing the electromagnets 29 and 30, which rotate together around the shaft 31. The pegs are distributed along two concentric circumferences and the pegs of the inner circumference are indicated as **20*a* and those of the outer circumference as 20*b*** (FIG. 4*b*). The inner electromagnet 29 borne by the shorter arm 21 cooperates with the series of pegs **20*a*, while the outer electromagnet 30 borne by the longer arm 22 cooperates with the series of pegs 20*b***.

The search unit 18 (see FIG. 2) is known and therefore does not form per se a part of the present invention. The operation of such units is also known once the operation of the determination of the record has been effected, the arms 21–22 rotate until one of the two electromagnets 29, 30 is opposite the peg correspoding to the program selected. At this moment there is instantaneous energization of the electromagnet concerned which causes the displacement of the peg and therefore the memorizing of the program selected. Thereupon (see FIG. 1) the record magazine is placed in rotation stopping conditions as a result of the peg which has been actuated, in the position in which the record-grasping arm 33 can remove the record from the magazine and bring it onto the record player table 34.

For a complete description of the parts and operation of the search unit 18, reference is had to the instruction manual of the "Diplomat" apparatus produced by Rowe AC Manufacturing Company.

This search unit 18 is supplemented, in accordance with the present invention, by a feed distributor 24 mounted coaxially on the shaft 31. This distributor which is shown in FIG. 4*c* and in greater detail in FIG. 3, comprises a rotating member 35 and fixed electric contacts, arranged concentrically which cooperate with said member. The contacts are distributed along two sectors 36 and 37 and are connected to the respective electromagnets 23 associated with the pegs of the memory disc 15 (see FIG. 4*a*) of the audio-visual apparatus 1. The rotating part 35 is keyed onto the shaft 31 and therefore rotates in synchronism with the arms 21 and 22 bearing the electromagnets 29 and 30 (see FIG. 4*b*). The function of this member is to distribute the power to the contacts 36 and 37 and from there to the electromagnets 23. For this purpose, the part 35 is provided with the two brushes 38 and 39 one end of each of which constantly wipes against a small metal plate 40 or 41 which furnish the power while its other end is successively connected with the series of corresponding contacts. The plates 40 and 41 in contact with the brushes 38 and 39 are respectively connected to the terminals 42 and 43. The series of contacts 36 and 37 as well as the plates 40 and 41 and their connections are preferably made as printed circuit on an insulating board 44 fastened to the search unit 18 by means of supports 45 (see FIG. 2).

By way of illustration let us assume that the sound reproduction apparatus in question has a capacity of 100 records and, therefore, 200 programs. In such case the 200 corresponding memory pegs may be distributed, as shown in FIG. 4*b*, on two concentric circumferences, 100 being arranged on one circumference and 100 on the other; each series of pegs being activated by a single electromagnet.

In accordance with the invention, given positions of excitation of the electromagnets 29 and 30 are used to insert the audio-visual programs of the audio-visual apparatus.

In one practical embodiment of the invention, these positions are inoperative for the sound reproduction apparatus in the sense that the acoustic playback of records does not correspond to them but only the projection of the film. In the case assumed it is clear that if it is desired to project 40 films, then only 160 of the 200 sound programs of the sound reproduction apparatus can be used.

In order to make the 40 positions of the sound reproduction apparatus made available to the 40 films inoperative, any system can be employed. In the particular case of a sound reproduction apparatus provided with pegs for the memory operations, the exclusion of a number of sound programs can be obtained by removing the corresponding pegs from the memory disc 19 so that the exciting of the electromagnet on empty holes does not result in any operation of the sound reproduction apparatus. It is clear that the same purpose can also be achieved by eliminating or deactivating some other member of the circuit. It is also obvious that in sound reproduction apparatus in which the memorizing is obtained with other devices, for instance with relays, capacitors, photoelectric cells, magnetic memorizations, etc., the positions or operations intended for the audio-visual programs are made inoperative for the sound reproduction apparatus by acting on circuits or components connected to such positions or operations. In any event, the non-playing of given records can be obtained by eliminating them from the record magazine.

In accordance with the invention, the energizing of 29 or of 30 in the inoperative positions causes the feeding of one of the electromagnets 23 of the audio-visual apparatus via the distributor 24 as shall be explained in greater detail. Referring to FIG. 4, of the forty pegs, corresponding to forty electromagnets 23, twenty are removed in a circular arc from the outer circumference 20*b*, and 20 of an opposite arc of the inner circumference 20*a*. In FIG. 4*b* at these circular arcs there are shown in empty circles the holes alone of the pegs.

The instantaneous energizing of the electromagnet 30 of the outer arc not bearing the pegs comprises instantaneous passing of a feed polarity to the plate 40 of the distributor 24 via the terminal 42. Similarly, the energizing of the electromagnet 29 of the inner arc not bearing the pegs entails the instantaneous passage of a feed polarity to the plate 41 via the terminal 43. At all times there is a single electromagnet to be energized and therefore a single one of the two plates to receive the polarity instantaneously.

The member 35 which rotates in phase with the arms 21 and 22 explores by means of its brushes 38 and 39 the contacts 36, 37 when the electromagnets of the arms 21, 22 are energized and positioned along the arc not bearing the pegs. In the case of an audio-visual apparatus having forty electromagnets (forty films), there will also be forty contacts of the distributor 24, twenty arranged on a sector 36 and 20 on the sector 37. The contacts 36 are indicated by A9, B9, C9, D9, E9 . . . V9 and are connected to the respective electromagnets, indicated as A9, B9, C9, D9, E9 . . . V9, which cooperate with the pegs of a semi-circumference of the disc 15.

In the FIG. 4, for clarity of presentation, there has been shown only the connection between the contact E9 and the electromagnet E9. The contacts 37 are indicated A0, B0, C0, D0, E0 . . . V0, and are connected to the corresponding electromagnets A0, B0, C0, D0, E0 . . . V0, cooperating with the pegs of the other semicircumference of the disc 15. Also by way of example, only the connection between E0 and E0 has been shown.

In the operation of the apparatus, even when the energizing of one of the two electromagnets 29 or 30 takes place in correspondence with an operating position for the sound reproduction apparatus (pegs present), the polarity could also be sent to the plates 40, 41, but in this case the member 35 would be in such position that none of its pegs could effect a connection between the plate and the corresponding contacts.

In FIG. 4, the electromagnets 29 and 30 are shown in the fifth position of the corresponding circular arcs not bearing the pegs. The member 35 which, as stated, rotates in phase with said electromagnets, is in the position in which the brushes place the plates in contact with the fifth contact of one or the other sector of contacts

36 and 37. If in this position the electromagnet 30 is energized, then in view of the hypothesis made at that moment, the polarity supplied to the plate 40 will be conducted through the brush 38 to the contact E9 and from the latter to the electromagnet E9 which energizing will instantaneously insert the corresponding peg of the disc 15. In this case a film has then been selected and the displacement of this peg results in the operation of the apparatus as audio-visual apparatus.

The same manner of operation is attained in the event that it is the electromagnet 29 which is to be energized in which event the plate 41, the brush 39, the contact E0 and the electromagnet E0 would be in circuit.

If, however, the electromagnets 29, 30 are energized in operating positions of the sound reproduction apparatus, the displacement of the peg signals the start of an audio performance (phonograph record). During this performance, the audio-visual apparatus is prevented from operating due to the action of an interlocking means E, which will be described below.

It is obvious that the action of one or the other apparatus for the sound reproduction apparatus or audio-visual apparatus depends on the selection made on the keyboard 8. For the case under consideration, combining the twenty letters with the figures 9 and 0, there are obtained forty (20×2) film selections. By combining the same letters with the other eight figures 1, 2 . . . 8, there are obtained 160 (20×8) selections of phonograph programs.

In the case of a sound reproduction apparatus, apparatus in which the memory disc is of the type shown in FIG. 4*b*, it is advantageous to distribute the inoperative positions for operation as sound reproduction apparatus over two circumferential arcs as this will make the selection procedure more rapid with one or the other electromagnet borne by the two opposite arms. However, all the positions corresponding to the projection of films could be located on the same circumference. Moreover, irrespective of the arrangement, it is not necessary that the inoperative positions be arranged in succession one after the other; this solution, however, is advantageous in order not needlessly to complicate the connections.

Furthermore, the opposite arrangement of the inoperative positions make it possible, in the case of elimination of the corresponding discs, to obtain a balancing of the rotating record-holder magazine. With regard to the energization of the plates 40 and 41, any circuit can be used. For instance, there can be used a line in parallel with the electromagnets 29, 30 or a suitable feed line which is closed as a result of the energizing of 29 or of 30. An essential condition is that, at least when the electromagnets 29 or 30 are energized in an inoperative position, energy is instantaneously supplied to one or the other plate 40 and 41. The polarity will be negative or positive depending on the polarity applied to the other terminal of the electromagnets 23 whose circuit must be closed to cause their energization. It is also obvious that the distribution of polarity to the various contacts 36 and 37 could be effected directly from the end of the member 35. It is also possible to rotate contact series 35 and 36 about shaft 31 while maintaining distributing member 35 stationary.

It should be noted that the length of the two brushes is different and thus the distance between the plates and contacts is different. In this way, each brush cooperates only with the contacts with which it is associated. There is thus assured the projecting of the film solely and exclusively in correspondence with the inoperative zones. The positions of energization of the electromagnets 29 and 30 for the operation of the audio-visual apparatus have been assumed to be the inoperative positions for the sound reproduction apparatus. These positions can, however, be operative also for the sound reproduction apparatus (not removing the pegs) and in such case the projection of a film is followed or preceded by the playing of a record, as can be understood from the diagram of FIG. 5. Said diagram relates to the audio-visual projection apparatus 1; it also shows the connections with other projection apparatuses and with the sound reproduction apparatus as well as interlocking means which exclude the sound reproduction apparatus when the audio visual apparatus is in operation and vice versa.

Figure 5:
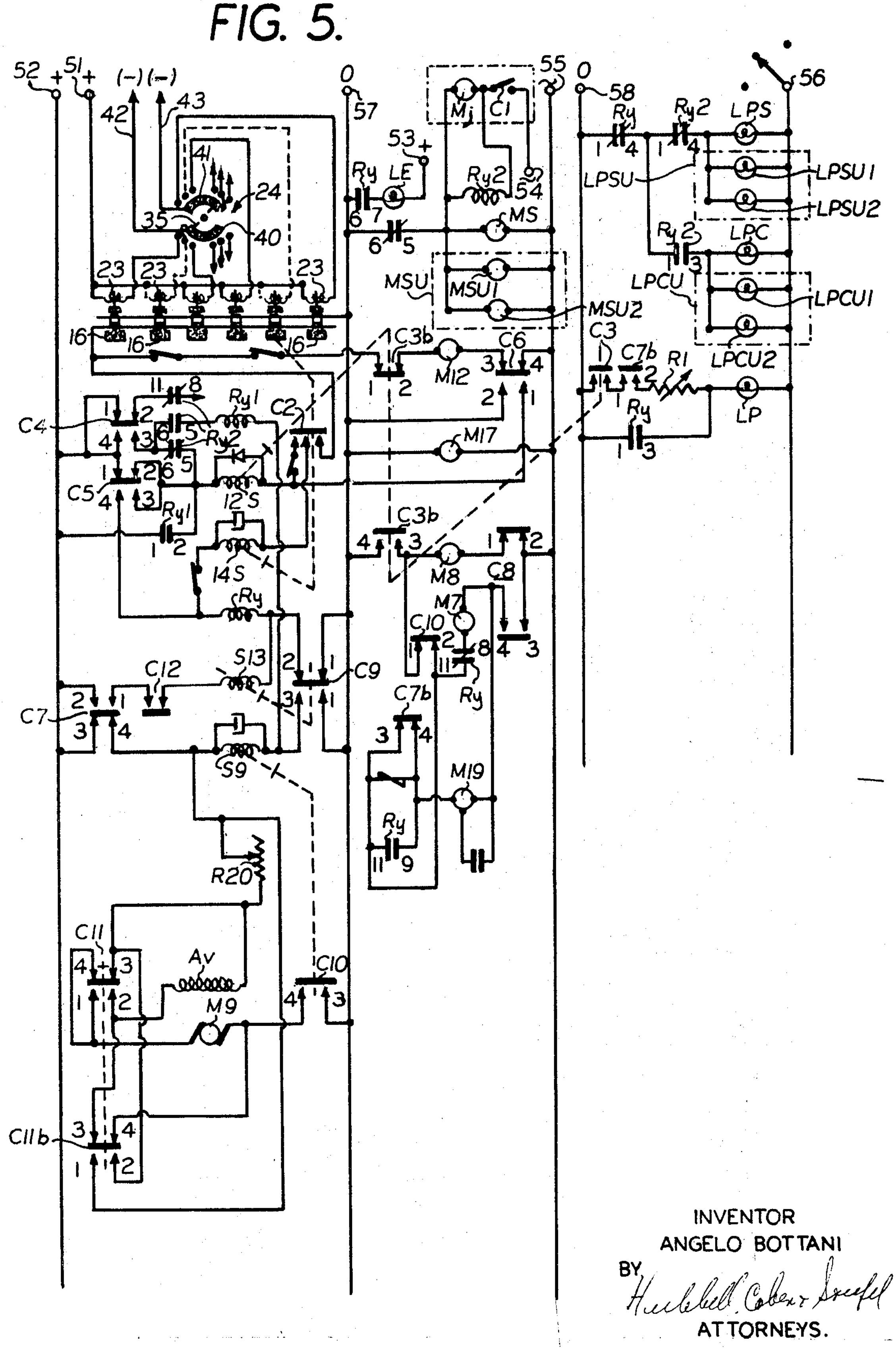
FIG. 5 is a schematic circuit diagram of the memory appartus of the audio-visual apparatus.

Referring now to FIG. 5, microswitches are indicated by the reference character C with designating suffixes, electromagnets by S with suffixes, motors by M with suffixes, and the relays by Ry, Ry1 and Ry2. 51, 52, 53 are the terminals to which D.C. voltages are applied and 54, 55, 56 are the terminals to which A.C. voltages are applied. Obviously, the values of these feed voltages vary in accordance with the characteristics of the components which they must feed. 57 and 58 are the common return lines. The parts MSU, LPSU, LPCU enclosed within the dot-dash lines are parts of remote projection units of the apparatus of FIG. 1 by which they are controlled.

The motor Mj and the contact C1, enclosed in the dot-dash line, are a part of the sound reproduction apparatus 2. Contact C1 closes whenever a record is brought on the record-holder table and opens whenever the disc is removed. M17 is the motor of the fan which is in operation for the entire period of operation of the combined apparatus.

Starting from the conditions of the combined apparatus at rest, the operation of the apparatus 1, referring to the said diagram of FIG. 5 and to FIG. 1, is as follows.

As soon as an audio-visual program, namely a film, has been selected, the search unit 18 of the apparatus 2, after various operations which concern the apparatus 32, will cause the energization of the inner electromagnet 29 or outer electromagnet 30 of the disc 19 corresponding to the position relating to the program selected. If the corresponding peg is absent, as is assumed, there is then involved a position that is inoperative for the sound reproduction apparatus which thus does not operate.

With the energizing of the electromagnet, there is instantaneously caused, via the distributor 24, the energizing of the electromagnet 23 of the disc 25 of the audio-visual apparatus corresponding to the film selected. In the diagram of FIG. 5, it is assumed that there is applied positive polarity (+) to terminal 51 and thus to one side of each electromagnet 23 and therefore the polarity which must be applied to the opposite terminals 42 and 43 is negative polarity (−).

With the energizing of an electromagnet 23, there is inserted the corresponding peg 16 of the memory disc 15 which closes a circuit between terminals 51 and 55 via contacts 1, 2 of switch C3b, motor M12, and contact 3–4 of switch C6. The motor M12 places the magazine of the films 4 in rotation which will stop when one of its microswitches C2 is engaged by the peg 16 previously inserted by the electromagnet 23. With this rotation the magazine 4 bears the reel of the film selected into the projection plane.

After this engagement, switch C2 closes its contacts causing the energizing of electromagnet 12S via contacts 1, 2 of switch C5 to thereby condition the apparatus for the energization of electromagnet 14S which is the electromagnet which serves to cancel the inserted peg.

The electromagnet 12S blocks the magazine 4 in the position reached and at the same time reverses switch C3b and switch C3. The closing of C3 conditions the feed circuit for energizing the film projection lamp LP; the opening of contacts 1, 2 of switch C3b interrupts the energizing circuit for the motor M12 which stops, and the closing of contacts 3, 4 of switch C3b closes the feed circuit for the motor M8 via contacts 1, 2 of switch C8.

After the rotation of the magazine in the type of apparatus 1 illustrated, provided with a single receiving spool 5, there is required the transportation of the film end of the selected film from the position of rest on the supply spool to the position of engagement with the takeup spool. This is effected by the ratchet arm 6 which is actuated by the motor M8. During the displacement, the arm 6 reverses switch C6 so that with the closing of its contacts 1, 2, negative voltage is supplied electromagnet 12S over another circuit, to prevent deenergization of electromagnet 12S upon the subsequent opening of C2. The arm 6, at the end of its stroke, and therefore when the end of the film has been brought into the position of engagement with spool 5, reverses switch C8. The opening of contacts 1, 2 of switch C8 will open the energizing circuit for motor M8 which has completed its function, while the closing of contacts 3, 4 of switch C8 establishes an energizing circuit for the motor M7 via contacts 8, 11 of relay Ry, contacts 1, 2 of switches C10, C3b and at the same time establish an energizing circuit for the motor M19 via contacts 3, 4 of switch C7b, contacts 1, 2 of switch C10 (1–2) and contacts 3, 4 of switch C3b. Motor M7 is the motor which effects the lowering of the presser arm 7. Motor M19 is the motor which starts the rotation of the spool 5 and of the film drive sprocket RT.

The presser arm 7 during its lowering movement reverses switches C7 and C7b, and the film, while it is assuming the projection path, reverses switch C4. At the end of its stroke, the arm 7 reverses switch C5 and arranges the film in the projection path. The closing of contacts 1, 2 of switch C7b completes the feed circuit for the lamp LP via the resistor R1. As a result of the inclusion of resistor R1 in circuit, the lamp LP lights up at reduced voltage. The opening of contact 3, 4 of switch C7b interrupts the feed circuit of motor M19 which, as a result of a flywheel mounted on its shaft, slowly decelarates so as to permit the takeup reel 5 slowly to fasten itself to the film end and the drive sprocket RT to insert itself gently into the perforations of the film.

The reversing of switch C7 causes the closing of its contacts 2–1 which condition the energizing circuit for the electromagnet S13 to be closed by contacts 1, 2 of switch C9 plus switch C12. This microswitch C12 controls the rewinding of the film and is placed on the outside of the cabinet of the combined apparatus at a known point which is accessible to the person in charge of the apparatus.

With the closing of switch C12, electromagnet S13 reverses the film rewind microswitch C9. The said switch C9 is the normal rewind microswitch and, therefore, is automatically switched at the end of the projection of the film by means Ts which will be described below.

The switching of C9 in all cases starts the film rewind process.

The actuating of manual switch C12 is effective whenever a film is being projected; however, the operation thereof is particularly advantageous when there is a break in the perforations of the film. As a matter of fact, in such case the film being projected is no longer fed by the drive sprocket RT and an immovable image appears on the screen 14. Under these conditions, the timely manual actuating of switch C12 makes it possible to free the apparatus from its blocked position in which it would be, since with the rewinding of the damaged film, the machine is available for the projecting of all other stored films which are in good condition.

Switch C4, upon reversing, with the closing of its contacts 4–3, prepares relay Ry1 for energization, maintains positive voltage on electromagnet 12S over contacts 5, 6 of relay Ry2, and feed positive voltage to contact 3 of switch C5. With the opening of contacts 1–2 of switch C4, the positive voltage is however removed from a silencing relay (not shown) which has the effect of placing the loudspeakers in operation.

The switch of switch C5 with the closing of its contacts 4–3 causes the energizing of electromagnet 14S via contacts 3, 4 of switch C4, contacts 5, 6 of relay Ry2, contacts 3, 4 of switch C5, switch C2, contacts 1, 2 of switch C6 and at the same time establishes an energizing circuit for relay Ry via contact 3, 4 of switch C4, contacts 5, 6 of relay Ry2 (6–5), contacts 3, 4 of switch C5 (4–3), and contacts 1, 2 of switch C9 (2–1).

The energizing of electromagnet 14S causes the return into the rest or normal position of the peg 16 which is inserted at the start of the operation, which in turn causes the closing of switch C2. The blocking electromagnet 12S continues, however, to remain energized via contacts 1, 2 of switch C6, which was previously closed. Thereupon the presser arm lowered and electromagnet 14S energized, the memory of the film being performed is cancelled, but the rotating magazine 4 still remains blocked as a result of the energizing of electromagnet 12S. The energizing of relay Ry comprises operations, only a few of which will be mentioned, namely:

The opening of contacts 1, 88 of relay Ry and therefore the opening of the removal of energizing circuit for motor M7 which actuates the presser arm, which is stopped;

The opening of contacts 5, 6 of relay Ry and therefore the disconnection of the common line 57 from the motor Mj of the record player of the sound reproducing apparatus;

The closing of contacts 9, 11 of relay Ry and therefore the reclosing of the energizing circuit of motor M19 via contacts 3, 4 of switch C3*b*, contacts 1, 2 of switch C10 and contacts 3, 4 of switch C 8;

The closing of contacts 1, 3 of relay Ry and therefore the closing of the energizing circuit for the projection lamp LP at normal voltage;

The closing of contacts 6, 7 of relay Ry to close the energizing circuit for lamp LE of the sound pickup group GL which cooperates with the photosensitive element EF for the optical sound reproduction.

From the above there can be noted the importance of relay Ry which, inter alia, causes the interruption of the circuit of the motor Mj which operates the record turntable 34 of the sound reproducing apparatus. The motor Mj can, therefore, not operate even if the switch C1 which operates in response to the presence of a disc on said turntable is closed. Therefore, with the presser arm 7 lowered, the film is driven at normal projection speed.

While the machine projects the film, its parts remain in the condition described for the entire projection of the film. It should, however, be pointed out that the energizing of electromagnet 12S is a necessary condition also for the subsequent operations of rewinding of the film.

During the unwinding of the film from the feed reel, the film is sensed by a feeler arm Ts, one end of which rests against the outer diameter of said reel. When the feed reel is completely unwound and, therefore, the projection of the film has come to an end, this arm Ts switches the contacts of the microswitch C9 which, as stated, is the microswitch which starts the normal film rewinding phase.

With the reversal of switch C9 to close the contacts 1, 3 thereof, the negative voltage is removed from relay Ry and from electromagnet S13 and is applied to relay Ry1 and electromagnet S9, placing them in condition for their energization. The relay Ry, upon becoming deenergized, releases and causes the reverse operations to those caused upon its energization. In particular contacts 8, 11 of Ry again connect the common line to motor M7 which therefore operates to bring the presser arm 7 back into its rest or raised position.

During this phase the microswitches C5, C7, C7*b* and C4 are again reversed by the arm and the film. Switch C5 recloses the energizing circuit to electromagnet 12S. Contacts 1, 2 of switch C4 now supplies positive voltage to the silencing relay via contacts 8, 11 of relay Ry2, cutting out the loudspeakers. Contacts 3, 4 of switch C7 supplies positive voltage to electromagnet S9 which, upon being energized, reverses the microswitch C10. Furthermore, it also supplies positive voltage to the rewind motor M9 and to its winding Av via the resistor R20. Motor M9 effects the rewinding by acting on the supply reel by means of a roller. The circuit of the motor is closed via switch C11, switch C11*b* and contacts 3, 4 of switch C10. Contacts 1, 2 and 3, 4 of switch C7*b* return to the rest or normal position.

In the meantime, the opening of contacts 1, 2 of switch C10 cuts off the ground line to the motor M7 which stops, leaving the presser arm in its raised or rest position. The presence of the winding Av permits the motor M9 to have two speeds.

During the rewinding of the film, another feeler arm, not shown, at its one end continuously "feels" the outside diameter of the takeup reel 5, which diameter decreases since the audio-visual apparatus is in its film rewind phase. This arm at the start and at the end of the rewinding, closes—via switches C11 and C11*b*—the circuit of the motor so as to establish the high speed and the low speed respectively. This will permit the gentle return of the film and of the ratchet arm 9 carried along by the film leader while it returns to the feed reel. The sudden change between the high speed and the low speed of the motor M9 is damped by a flywheel mounted on the shaft of said motor.

The ratchet arm 6 in its return rotation again switches the microswitches C6, C9 and C8. The switching of C6 removes the negative voltage from electromagnet 12S which is thereby deenergized, thus unblocking the magazine 4. In its turn, electromagnet 12S upon going to rest reverses the microswitches C3 and C3*b*, restoring the starting circuit. Switch C9 removes the negative polarity from electromagnet S9 which is thereby deenergized, thus releasing the rewind roller from the feed reel and reversing switch C10 which in its turn cuts off the power to the motor M9.

At this point, full cycle of the machine is completed and in case other pegs concerning other films have been inserted, the machine will again carry out the cycle described above.

In the previous description, reference has been had to the apparatus shown in FIG. 1. It is clear, however, that the film projection apparatus may be different. For example, it may be of the type comprising two magazines rotating together around a horizontal or vertical shaft, one bearing the feed reels and the other the takeup reels. An apparatus of the type with horizontal axis is illustrated in U.S. Pat. No. 3,041,926.

In apparatus having two magazines it is obvious that there is no need for the members relating to the transport of the film into projection position and particularly the ratchet arm 6 and corresponding motor M8.

Let us now consider the operation of the sound reproduction apparatus 2 starting from the condition of the combined apparatus at rest.

As soon as a record has been selected and the various operations have been completed by means of the search unit 18, the disc-grasp arm 33 bears the selected disc onto the turntable 34 (see FIG. 1). Referring to the diagram of FIG. 5, as soon as this operation has been completed, the contacts of switch C1 in the energizing circuit for the motor Mj become closed. This circuit is closed between terminals 54 and 57 via relay Ry (6–5) and thereupon the motor is placed in operation to rotate the phonograph turntable.

The audio program selected is then performed.

With the closing of switch C1, relay Ry2 is also energized, which relay, as will be explained, is the one which excludes the audio-visual apparatus from operation for the entire time of playback of the record.

Therefore, the two apparatuses 1 and 2 cannot interfere with each other and the said relay Ry excludes the sound reproduction apparatus when the audio-visual apparatus is in operation, while relay Ry2 excludes the latter when the sound reproduction apparatus is in operation.

It is important to note that this interlocking means excludes the one apparatus or the other only during the time in which the projecting of a film or the playing back of a record actually takes place. In other words, while one apparatus is carrying out a program, the other apparatus is able to carry out all the preliminary operations of selection, memorization, etc., of a selected program until the support (disc or film) of the program is carried to performance starting position; however, this phase cannot start since it is from this point on that the apparatus is precluded by the other apparatus which is in operation.

In this way it will be understood that the lost time between the performance of selected programs of one of any other apparatus is minimal. To further clarify this feature, let us now consider the operation of the apparatuses 1 and 2.

Let it be assumed that a film is being projected and that in the meantime a record is selected. Since the film is being projected (arm 7 lowered), relay R*y* is energized and therefore contacts 5, 6 of relay R*y* in the motor circuit M*j* are open. under these conditions, if a record is selected, it will be brought onto the turntable 34 and a switch C1 will close but the motor M*j* cannot place the record in rotation since its energizing circuit is open at contacts 5, 6 of relay R*y*.

As soon as the projecting of the film has been terminated with the switching of switch C9, relay R*y* releases and with the closing of its contact 5, 6 relay R*y*2 becomes energized to close the circuit for the motor M*j* which causes the rotation of the disc.

While the record playing is taking place there are carried out in the audio-visual apparatus, the film rewinding operations which can take place since the energizing of electromagnet 12S is assured by the energizing of relay R*y*1 which closes the contacts 1, 2 of relay R*y*1. Relay R*y*1 will have been energized as a result of the closing of contacts 6, 7 of relay R*y*2.

Let it now be assumed that a record is being played and that in the meantime a film is selected. The energizing of the control relay R*y*2 causes the opening of the contacts 5, 6 of relay R*y*2 and the closing of the contacts 6, 7 of relay R*y*2. If a film is selected, a peg 16 is inserted, the motor M12 starts up and the magazine 4 enters into rotation until the closing of the switch C2 which causes the energizing of electromagnet 12S via contacts 1, 2 of switch C5. The energizing of this electromagnet causes the stopping of motor M12, the starting of motor M8 and thereupon of motor M7 which, as stated, is the motor which brings the presser arm 7 into the lowered projection position. As soon as the arm is in this position the microswitch C5 is reversed and opens its contacts 1, 2. Under these conditions, electromagnet 12S is deenergized since it no longer receives positive voltage from terminal 52. As a result, the subsequent operations of the starting of the takeup reel 5 and of the drive sprocket RT cannot take place. The film remains in this position of initial projection until the playing back of the record disc has been completed. When said playback has been completed, the disc is removed from the table and in this phase switch C1 opens which causes the deenergizing of relay R*y*2. Therefore, contacts 5, 6 of relay R*y*2 close again and the electromagnet 12S is re-energized since contacts 3, 4 of switch C4 are closed. With the energizing of eletcromagnet 12S, the projecting proper of the film can start.

When the combined apparatus of FIG. 1 is at rest or the sound reproduction apparatus 2 is in operation, the projection screen 14 is not illuminated. In accordance with the invention, said screen, even under these conditions, is used by special projections in order to assure continuity of the entertaining or advertising programs. This is obtained by mounting on the combined apparatus a slide projector 27 and/or a kaleidoscope 28, the first being placed automatically in operation when no program is being performed and the second being placed automatically in operation during the playback of a record. The use of the kaleidoscope makes it possible to provide a visual background for the record being performed and therefore to have an interesting display even during the playing of the records.

Although any circuit can be provided in order automatically to control the entering into operation of the projector 27 or of the kaleidoscope 28 respectively when the apparatus is at rest or playing a record, it is advantageous in accordance with the invention to use the same circuits or numbers already present in the apparatus and taking advantage of the condition or position which they assume in said conditions of the apparatus to drive the projector or the kaleidoscope.

In accordance with a particular embodiment of the invention, the motor MS which controls the slide projector 27 is controlled by the same relay R*y* which is energized during the operation of the audio-visual apparatus while the projection lamp LPS of the projector is controlled not only by the said relay R*y* but also by the relay R*y*2 which is energized during the playing of a record. Referring to the diagram of FIG. 5, it can be seen that, when the apparatus is not playing any program, contacts 1, 4 and 5, 6 of relay R*y* and contacts 1, 4 of relay R*y*2 being closed, both the motor MS and the lamp LPS are energized. The screen 14 is therefore used also in this stage of rest of the apparatus. The slides can, for instance, be of an advertising nature.

As soon as a film has been selected, at the moment when the film projection starts and for the entire time that said projection lasts, the relay R*y* is energized, as stated above. Hence, the contacts 1, 4 and 5, 6 of relay R*y* are open and, therefore, the projecting of slides is prohibited. This projection, however, will start again when the film has been completely projected since at that time relay R*y* becomes deenergized and, therefore, the said contacts will close on the circuit of the motor MS and of the lamp LPS.

In accordance with a modification, the motor MS and the lamp LPS could be controlled by a microswitch K associated with the presser arm 7 which closes the feed circuits when said arm is raised.

In accordance with the invention, for the operation of the kaleidoscope, one of the output connections *u* of the amplifier 12 feeds the vibrator group of the kaleidoscope 28 while the projection lamp LPC of the latter is itself also controlled by the relays R*y* and R*y*2.

Referring still to the diagram of FIG. 5, it is seen that only when the apparatus is playing back a record, relay R*y*2 being energized and relay R*y* de-energized, will there be closed the energizing circuit of lamp LPC via contacts 1, 4 of relay R*y* and contacts 1, 3 of relay R*y*3. The screen 14 is therefore used for the projecting of images which vary with reference to the sound pulses transmitted by the amplifier 12 whose input, during this phase, is fed from the pickup of the sound reproduction apparatus.

As soon as the audio program has ceased, relay R*y* is de-energized and hence with the reopening of contacts 1, 3 of relay R*y*2, the lamp LPC goes out.

In FIG. 1 the kaleidoscope 28 has not been shown in detail because it is known and does not in itself form a part of the invention. The kaleidoscope, which may be of any type, comprises substantially a container of thin, colored, transparent, movable shapes of plastic and preferably glass. The container is agitated by a vibrator group while it is illuminated by the projection lamp, which projects onto the screen the various movable shapes thus giving rise to continually varying images and designs. Since the vibrator group is placed in movement by a coil which is traversed by variable pulses coming from the amplifier fed by the pickup, it will be understood that the oscillations of the vibrator and therefore the fancy formation of images projected onto the screen will correspond to the acoustic pulses recorded on the record.

In accordance with another aspect of the invention, when it is desired to obtain sound and visual programs in premises at a distance from the apparatus of FIG. 1, for instance in different floors or rooms of supermarkets or shops, projection units of stationary or portable suitcase type arranged on various distant floors or rooms, are connected to said apparatus which is located at a suitable place where it can easily be checked.

Figure 7:
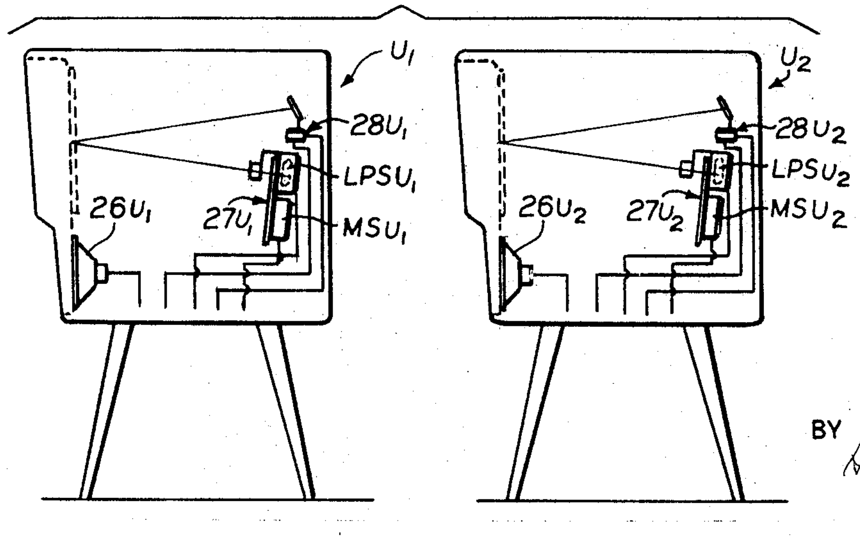
FIG. 7 is a view similar to FIG. 6 illustrating a pair of remote projection units functionally controlled by the apparatus of FIG. 6 or FIG. 1.
Figure 3:
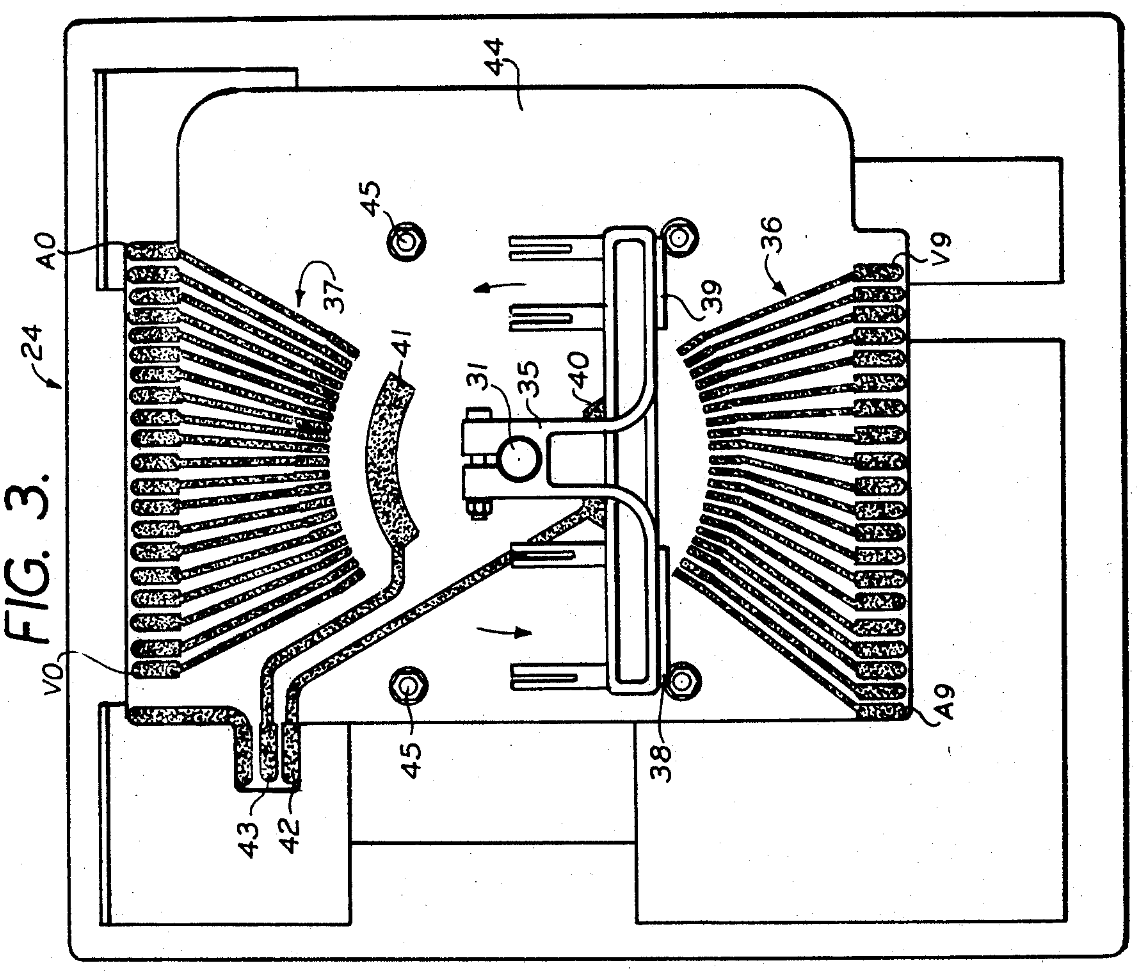
FIG. 3 is a plan view of the power feed distributor of the memory apparatus associated with the audio-visual apparatus.
Figure 6:
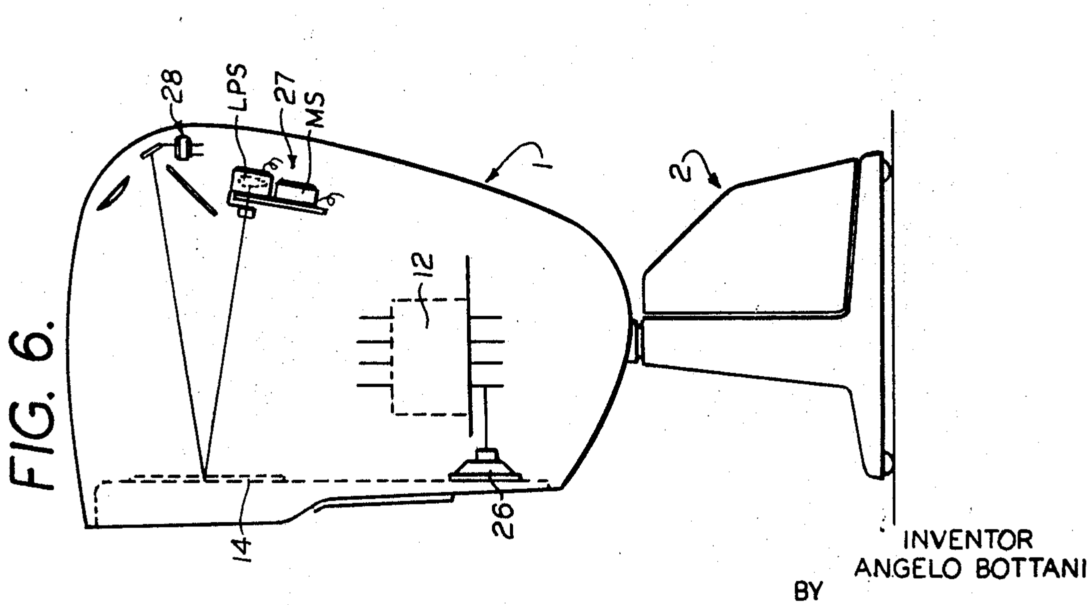
FIG. 6 is a view similar to FIG. 1 but with additional parts of the combined apparatus deleted to more clearly illustrate the parts included.

In accordance with the invention, each such projection unit comprises a screen, one or more loudspeakers, a slide projector and a kaleidoscope. FIG. 7 shows two projection units U1 and U2 in accordance with the invention. There are indicated in these units with the same reference characters as the members corresponding to those of the apparatus of FIG. 1 with the subscript U1 or U2 depending on whether they form part of the first or second unit. There are further indicated for each unit four single-pole feed connections, two for the slide projector and two for the kaleidoscope.

The motors $MS_{U1}$ and $MS_{U2}$ and the projection lamps $LPS_{U1}$ and $LPS_{U2}$ of the units U1 and U1 are connected in parallel to the motor MS and to the projection lamp LPS respectively of the apparatus of FIG. 1.

The lamps $LPC_{U1}$ and $LPC_{U2}$ (see FIG. 5) of the kaleidoscopes $28_{U1}$ and $28_{U2}$ are in parallel with the lamp LPC of the apparatus of FIG. 1, while the vibrator group of the said kaleidoscopes is fed by the amplifier 12, similar to the feeding of the vibrator group of the kaleidoscope 28.

The loudspeakers $26_{U1}$ and $26_{U2}$ are also fed by the amplifier 12 in a manner similar to the loudspeaker 26 of FIG. 1.

The operation of the projection units U1 and U2 is similar to that of the apparatus in condition of rest and of playback of a record. Finally, one important feature of the invention consists in providing means which make the vibrations of the vibrator group of the kaleidoscopes independent of the sound volume and in the providing of special movable particles of glass, for instance blown glass, in the shape containers.

The first feature is obtained with a regulator provided in the amplifier 12. By this regulator the current pulses passed to the kaleidoscope remain contained within a given level.

While I have herein described the peg moving means as electromagnets, it will be understood that solenoids can be employed for this purpose with no rearrangement of the electrical circuitry. Furthermore, while the apparatus herein is referred to as coin controlled, it will be understood that tokens could be employed to actuate such apparatus and, if desired, a simple manual switch or pushbutton could be so employed. Obviously, the apparatus will find its greatest commercial use as a coin controlled apparatus but the claims are not intended to be limited by the use in the introductory phase thereof of the words "coin operated."

While I have herein shown and described the preferred form of the present invention and have suggested modifications thereof, other changes and modifications may be made therein within the scope of the appended claims without departing from the spirit and scope of this invention.

What is claimed is:

1. A coin operated combined sound reproducing apparatus and audio-visual apparatus, comprising:

sound reproducing apparatus including a plurality of sound recordings, playback means therefor, and means for selecting said recordings;

audio visual apparatus including a plurality of sound films, sound projection apparatus for said films, and means for selecting said films for projection;

and means for alternatively actuating said two selecting means comprising memory means including input means, memory apparatus responsive to said input means for storing information received from said input means for both said selecting means, and means for connecting said memory apparatus to said selecting means for actuating said selecting means in accordance with the information stored by said memory apparatus.

2. The combined apparatus of claim 1, wherein said memory means comprises a pair of memory apparatuses, one for said sound reproducing apparatus and one for said audio-visual apparatus, each memory apparatus including a plurality of movable pegs and electromagnetic means for moving said pegs, one of said pegs for each of said films, one of said electromagnetic means for each peg in the audio-visual apparatus memory apparatus, one peg for each of said sound recordings arranged in a row in spaced relation to one another, said electromagnetic means associated with said sound reproducing apparatus being movable relative to said pegs along said row, and circuit means for energizing a selected electromagnetic means associated with a peg associated with a selected film controlled by said electromagnetic means in said sound reproducing apparatus memory apparatus and closed when said last mentioned electromagnetic means is in a predetermined relative position along said row and is energized.

3. The combined apparatus of claim 2, wherein the pegs in the sound reproducing apparatus memory apparatus are arranged in a circular row and the electromagnetic means in said sound reproducing apparatus memory apparatus is mounted on an arm that is movable relative to said circularly arranged pegs along the circumference of said circle, and said circuit means for energizing said electromagnets of said audio-visual apparatus includes an arcuate power-feed distributor controlled by the electromagnetic means of said sound reproducing apparatus.

4. The combined apparatus of claim 3, wherein said power feed distributor comprises a plurality of spaced apart contacts, one for each electromagnet in said audio-visual memory apparatus, and brush means rotatable with said electromagnetic means in said sound reproducing memory apparatus and engageable with said contacts in said predetermined relative positions of said electromagnetic means of said sound reproducing apparatus.

5. The combined apparatus of claim 2, wherein said pegs in said sound reproducing apparatus memory apparatus are arranged in a pair of concentric circular rows and the electromagnetic means in said sound reproducing apparatus are a pair of electromagnets, one for each circular row, fixedly mounted on a pair of concomitantly rotatable diametrically opposed arms at a distance from the center equal to the radius of the circular row of pegs associated with the respective electromagnets.

6. The combined apparatus of claim 5, further comprising power distribution means in said circuit means for selectively energizing the electromagnet means of said audio-visual apparatus memory apparatus, comprising a plurality of spaced apart contacts, one for each electromagnet in said audio-visual apparatus memory apparatus, and brush means rotatable with said concomitantly rotatable arms and engageable with said contacts in said predetermined relative positions of said arms.

7. The combined apparatus of claim 6, said power distribution means further comprising a pair of arcuate conductors, and additional brush means rotatable with said arms and conductively engageable with said arcuate conductors in said predetermined positions.

8. The combined apparatus of claim 7, further comprising a rotatable shaft, and wherein both said brush means and both said arms are mounted on said shaft for rotation therewith.

9. The combined apparatus of claim 7, wherein when said electromagnetic means of said memory apparatus of said sound reproducing apparatus are in said predetermined position, they are not of operative relationship with the pegs of said sound reproducing apparatus.

10. The combined apparatus of claim 1, further comprising means for detecting the film projection operation of the audio-visual apparatus, a turntable motor for the sound reproducing apparatus, and circuit means for energizing said turntable motor controlled by said projection detecting means and open when said projection detecting means is detecting projection.

11. The combined apparatus of claim 1, further comprising means for detecting the sound reproducing operation of the sound reproducing apparatus, means for preventing projection operation of said audio-visual apparatus, and means for actuating said preventing means effective when said sound reproducing detecting means detects sound reproducing operation.

12. The combined apparatus of claim 9, further comprising means for detecting the film projection operation of the audio-visual apparatus, a turntable motor for the sound reproducing apparatus, and circuit means for energizing said turntable motor controlled by said projection detecting means and open when said projection detecting means is detecting projection and means for detecting the sound reproducing operation of the sound reproducing apparatus, means for preventing projection operation of said audio-visual apparatus, and means for actuating said preventing means effective when said sound reproducing detecting means detects sound reproducing operation.

References Cited

UNITED STATES PATENTS

| | | | |
|---|---|---|---|
| 2,330,036 | 9/1943 | Eakins | 352—6 |
| 3,081,668 | 3/1963 | Nistri | 352—123 |
| 3,383,156 | 5/1968 | Fried | 352—8 X |

FOREIGN PATENTS

| | | |
|---|---|---|
| 322,234 | 11/1929 | Great Britain. |

NORTON ANSHER, Primary Examiner

M. H. HAYES, Assistant Examiner

U.S. Cl. X.R.

40—28.1; 352—7, 123